(12) United States Patent
Yamada et al.

(10) Patent No.: US 6,801,572 B2
(45) Date of Patent: Oct. 5, 2004

(54) METHOD AND APPARATUS FOR IMAGE SIGNAL ENCODING

(75) Inventors: Kohji Yamada, Kawasaki (JP); Kiyoshi Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 587 days.

(21) Appl. No.: 09/815,057

(22) Filed: Mar. 23, 2001

(65) Prior Publication Data

US 2002/0034246 A1 Mar. 21, 2002

(30) Foreign Application Priority Data

Aug. 4, 2000 (JP) ........................................ 2000-237572

(51) Int. Cl.$^7$ ............................ H04N 7/12; H04N 7/32
(52) U.S. Cl. ................. 375/240.03; 348/419.1
(58) Field of Search ................. 375/240.03, 240.07, 375/240.12, 240.22; 348/394.1, 404.1, 419.1; 382/239, 251, 253; H04N 7/32, 7/12

(56) References Cited

U.S. PATENT DOCUMENTS

| | | | | |
|---|---|---|---|---|
| 5,136,371 A | * | 8/1992 | Savatier et al. | ........ 375/240.05 |
| 5,241,383 A | * | 8/1993 | Chen et al. | ............ 375/240.04 |
| 5,283,646 A | * | 2/1994 | Bruder | .................. 375/240.12 |
| 5,986,710 A | * | 11/1999 | Kim et al. | ................ 375/240.2 |
| 6,011,589 A | * | 1/2000 | Matsuura et al. | ...... 375/240.14 |
| 6,064,436 A | * | 5/2000 | Okada | .................. 375/240.16 |
| 6,088,392 A | * | 7/2000 | Rosenberg | ............. 375/240.03 |
| 6,181,742 B1 | * | 1/2001 | Rajagopalan et al. | ........ 375/240 |
| 6,278,735 B1 | * | 8/2001 | Mohsenian | .................. 375/240 |
| 6,480,539 B1 | * | 11/2002 | Ramaswamy | .......... 375/240.03 |
| 6,539,124 B2 | * | 3/2003 | Sethuraman et al. | ........ 382/251 |
| 6,654,417 B1 | * | 11/2003 | Hui | ........................ 375/240.03 |
| 6,678,324 B1 | * | 1/2004 | Yamauchi | .............. 375/240.04 |

FOREIGN PATENT DOCUMENTS

JP          8-65683          3/1996

* cited by examiner

*Primary Examiner*—Nhon Diep
(74) *Attorney, Agent, or Firm*—Staas & Halsey LLP

(57) ABSTRACT

A method and an apparatus to realize high quality image signal encoding at a variable bit rate, which is provided by the first quantization scale—maximum data volume calculation unit that calculates the maximum data volume and the first quantization scale based on encoding results of an encoded image frame, the quantization control buffer calculation unit that calculates a predicted data volume for a given encoding block that belongs to the encoding target image frame from the maximum data volume while receiving the originated data volume of the image frame that is quantized, encoding block (macroblock) by encoding unit (macroblock), by the quantization scale and calculates the second quantization scale based on the difference between the predicted data volume and the originated data volume, and the quantization control unit 10 that compares the first quantization scale with the second quantization scale to output the larger of the two scales.

15 Claims, 14 Drawing Sheets

METHOD AND APPARATUS FOR IMAGE SIGNAL ENCODING

BACKGROUND OF THE INVENTION

1. Field of the Invention

The present invention generally relates to a method and an apparatus for image signal encoding, and particularly relates to a method and an apparatus for image signal encoding, which encodes image signals at variable bit rates.

2. Description of the Related Art

Recently, such an international standard as MPEG (Moving Picture Experts Group) is employed in an image signal encoding apparatus. In such an apparatus, a VBV (Video Buffering Verifier) is virtually connected to a bitstream output point of the image signal encoding apparatus so that the bitstream shall not collapse a receiving buffer of the image signal decoding apparatus by preventing a collapse at the VBV.

FIG. 1 shows an example of VBV buffer occupancy index that varies with time. At a time A, a bitstream starts to flow into the VBV, and the occupancy increases as time elapses. At a time B, the occupancy decreases by data volume D which is the volume of the data of an image frame then decoded. From the time B to a time C, the buffer occupancy index increases. At the time C, the occupancy decreases by data volume E that is the volume of the data of an image frame then decoded. In FIG. 1, a slope of the buffer occupancy while the buffer occupancy index increases represents a transmission rate of the bitstream supplied to the VBV.

In the image signal encoding apparatus, it is necessary to control the encoding so that the buffer occupancy is between 0 and a given buffer size. If the control is not appropriate, then the VBV will collapse as shown in FIGS. 2 and 3.

FIG. 2 shows an example of an underflow that occurs at the VBV. At a time F, a bitstream starts flowing into the VBV, increasing the buffer occupancy index. At a time G, the occupancy decreases by data volume I which is the volume of the data of an image frame then decoded. The buffer occupancy index increases from the time G to a time H.

At the time H, not all of the bitstream for an image frame to be decoded has arrived. The image frame cannot be decoded. This situation is called a buffer underflow.

Conversely, FIG. 3 shows an example of an overflow. The bit rate control method in a constant rate encoding mode is different from that in a variable bit rate encoding mode. The overflow of the VBV occurs in the constant bit rate encoding mode.

At a time K, a bitstream starts flowing into the VBV to increase the occupancy. At a time L, an image frame with data volume N is decoded, and decreases the buffer occupancy index by N. From the time L to a time M, the buffer occupancy index increases.

At the time M, an image frame is to be decoded. However, volume of data that was decoded at the time L was small, which causes the buffer occupancy index of the VBV to reach the given buffer size before the time M. For this reason, at the time M, not all of necessary bitstream has been received and a normal decoding is impossible. This situation is called an overflow.

FIG. 4 shows an example of the buffer occupancy index behavior with time in the variable bit rate encoding mode. In the variable encoding mode, there is no buffer overflow.

When the buffer occupancy index reaches at the given buffer size, then the bitstream stops flowing. As the buffer occupancy index decreases, the bitstream resumes flowing.

At a time P, a bitstream starts flowing into the VBV, increasing the buffer occupancy index. At a time Q, an image frame of which data size is T is decoded, thereby decreasing the occupancy index by T. From the time Q to a time R, the buffer occupancy index increases.

At the time R, the buffer occupancy index reaches at the given buffer size, thereby stopping the bitstream flowing to the VBV. At a time S, an image frame of which data volume is U is decoded, which makes the buffer occupancy index decrease by U. Then, the bitstream to the VBV resumes flowing.

The overflow and underflow of the buffer occur where the originated data volume control at encoding is inappropriate. A proper control of the originated data volume at encoding is necessary. In order to control the originated data volume at encoding, an appropriate target data volume is set to an image frame. The originated data volume is controlled so as to meet the target volume.

Conventionally, such a control as follows has been practiced in order to make the originated data volume to approximate the target volume. In the following description of an example, T represents the target data volume of an image frame, $d_0$ represents an initial occupancy of a quantization control buffer, $d_j$ represents an occupancy of the quantization control buffer immediately before encoding an encoding block (macroblock) j, $B_j$ represents an originated data volume from a first encoding block (macroblock) of the image frame to the j-th encoding block (macroblock), $MB_{cnt}$ represents a number of encoding blocks (macroblocks) in an image frame, Q represents a quantization scale code by which the j-th encoding block (macroblock) is quantized and r represents an reaction parameter.

The reaction parameter r is given by a formula (1) presented below by a frame rate of a moving image "picture_rate" and an encoding bit rate "bitrate".

$$r = 2 \times (\text{bitrate})/(\text{picture\_rate}) \qquad (1)$$

An encoding block (macroblock) is made of a plurality of pixels. As shown in FIG. 5, the occupancy of the quantization control buffer when encoding the j-th encoding block (macroblock) is given by a formula (2) below. In FIG. 5, the hatched blocks represent encoded macroblocks and others represent macroblocks that have not been encoded.

$$d_j = d_0 + B_{j-1} - (T \times (j-1))/MB_{cnt} \qquad (2)$$

Thus calculated quantization control buffer occupancy index is substituted to a formula (3) below, to obtain a quantization scale code by which the j-th macroblock is to be quantized.

$$Q = d_j \times 31/r \qquad (3)$$

The scale code Q thus calculated by the formula (3) is substituted to a formula (4) below to obtain the quantization scale QS.

$$QS = Q \times 2 \qquad (4)$$

By performing the process described above for all the macroblocks in the image frame, the originated data volume approximates to the target data volume. If the originated data volume is greater than the target data volume, then the quantization scale QS is enlarged to reduce the originated data volume, and if the originated data volume is smaller than the target data volume, then the quantization scale QS is made smaller to increase the originated data volume. In this manner, the receiving buffer collapse has been suppressed.

In a conventional image signal encoding apparatus, the constant bit rate encoding mode has been employed, which transfers encoded image signal at a constant encoding bit rate due to requirements from networks or the like. In the constant bit rate encoding mode, however, there is a tendency to build picture quality differences between images that are difficult to compress because of complexity and abrupt motions in the image and relatively still images that are easy to compress. On the other hand, in the variable bit rate encoding mode, a higher encoding bit rate is used for images that are difficult to compress and a lower encoding bit rate is used for images that are easy to compress so that there is no quality difference between the hard-to-compress images and the easy-to-compress images.

With recent availability of wideband asynchronous networks such as IP (Internet Protocol) networks and developments of storage media compliant with the variable bit rate encoding mode, the variable bit rate encoding mode for compressed image signals has been developed and put into practice.

A variable bit rate encoding mode used in DVD (Digital Versatile Disk) is called an n-path variable bit rate encoding method and requires two or more encoding steps to compress-encode moving pictures. For example, 2-path variable bit rate encoding method first determines a degree of difficulty in compression of each compressed image frame by encoding the frame at a constant compression ratio. Then, in a second encoding, each frame is encoded based upon data volume of each image frame. Therefore, the n-path variable bit rate encoding method cannot perform a realtime encoding of image frames.

In a disk recording apparatus and a disk installed camcorder that use a hard disk, DVD-RAM (DVD-Random Access Memory) and the like, the variable bit rate encoding mode is employed to enable recording of a high quality motion picture for a number of hours. A realtime encoding of image frames is necessary. To realize the realtime encoding, a method has been developed in which a degree of the difficulty in encoding a next frame is predicted from statistical information of frames already encoded, and based on which and observing an average encoding bit rate, the realtime image frame encoding is performed.

Further, in the variable bit rate encoding mode that uses the statistical information of encoded frames, a target data volume for an image frame is set, and the encoding is performed to originate data volume to an approximation of the target volume, similarly to the constant bit rate encoding mode. However, in an encoding bit rate equal to or less than 2 Mbps (bits per second), the size of an image frame is a bigger than 720×480, and a wrong prediction of originated data volume for an image frame creates a following problem.

For example, if a compression of a next image frame is predicted easy and set the target originating data volume small, however, actual image is found to be difficult to compress, then picture quality is deteriorated due to a high compression ratio to compress the image to the small target originated data volume.

SUMMARY OF THE INVENTION

Accordingly, it is an object of the present invention to provide a method and an apparatus for image encoding which enable high picture quality variable bit rate encoding that is responsive to abrupt changes of the images.

The above object of the present invention is achieved by an image signal encoding method in which an image frame is quantized by a quantized scale and thus quantized image frame is encoded includes a step wherein a predicted data volume is calculated for a given encoding block (macroblock) of a target encoding image frame from a calculated maximum data volume after the maximum data volume and a first quantization scale are calculated based on an encoding result of previously encoded image frames, a step in which the encoding block (macroblock) of the encoding target image frame is quantized by the quantization scale and an originated data volume is calculated for an encoded image frame, a step in which the predicted data volume is compared with the originated data volume, result of which is used to calculate a second quantization scale for updating and a step in which the first quantization scale is compared with the second quantization scale, the larger of the two to be used for updating as a new quantization scale.

In an image signal encoding method as above, the first quantization scale based on an encoding result of image frames previously encoded is compared with the second quantization scale which is based on a comparison of the maximum data volume and the originated data volume, and the larger of the two is taken as a new quantization scale. The second quantization scale respects the maximum data volume, thereby enabling to prevent a collapse of a quantization control buffer and a violation of a maximum encoding bit rate when the quantization is performed at a quantization scale that is at least greater than the second quantization scale.

The present invention which is also related to an image signal encoding apparatus in which an image frame is quantized by a quantization scale and thus quantized image frame is then encoded includes a first quantization scale—maximum data volume calculation unit, a quantization control buffer calculation unit, and a quantization control unit. The first quantization scale—maximum data volume calculation unit calculates the maximum data volume and the first quantization scale based on an encoding result of image frames previously encoded. The quantization control buffer calculation unit calculates a predicted data volume for a given encoding block (macroblock) in the target encoding image frame from the maximum data volume, quantize the macroblock that belongs to the target encoding image frame by the quantization scale, and calculates the second quantization scale based on a difference between the predicted data volume and the originated data volume that is the volume of the data originated when the quantized image frame is encoded. The quantization control unit compares the first quantization scale with the second quantization scale and outputs the larger of the two as the new quantization scale.

The image signal encoding apparatus as above includes the first quantization scale—maximum data volume calculation unit that calculates the first quantization scale based on the encoding result of image frames already encoded, the quantization buffer calculation unit that calculates the second quantization scale based on a comparison of the maximum data volume with the originated data volume and the quantization control unit that compares the first quantization scale with the second quantization scale to output the larger of the two scales, thereby performing a quantization at a quantization scale at least the second quantization scale that respects the maximum data volume thus enabling to prevent a collapse of the quantization control buffer and a violation of the maximum encoding bit rate.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
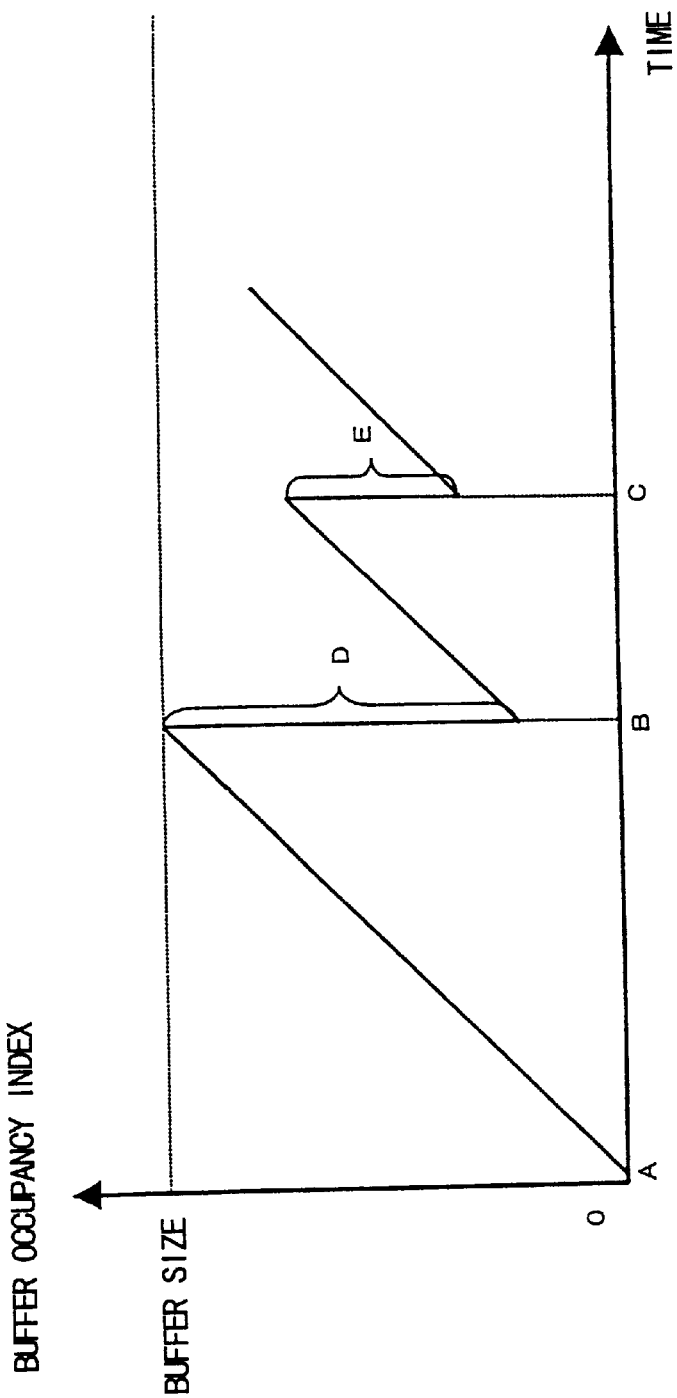
FIG. 1 shows an example of VBV buffer occupancy index change with time
Figure 2:
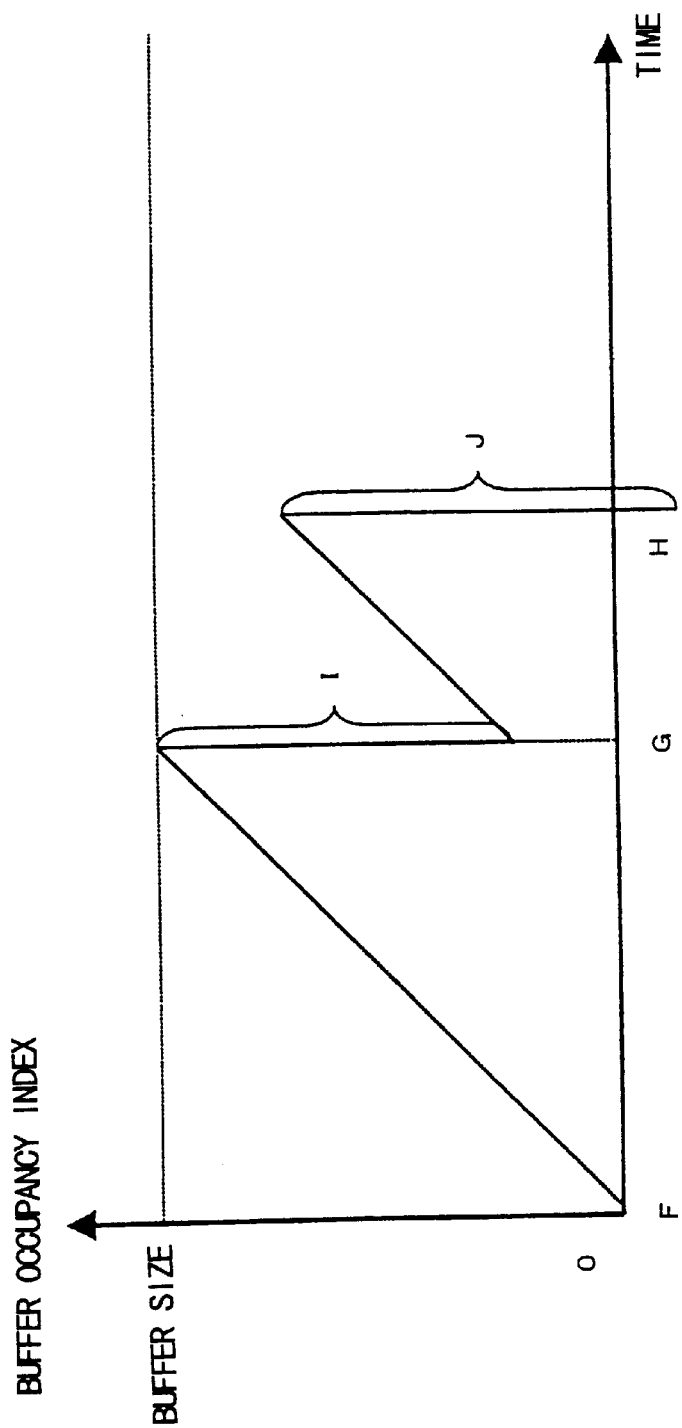
FIG. 2 shows an example of an underflow at VBV.
Figure 3:
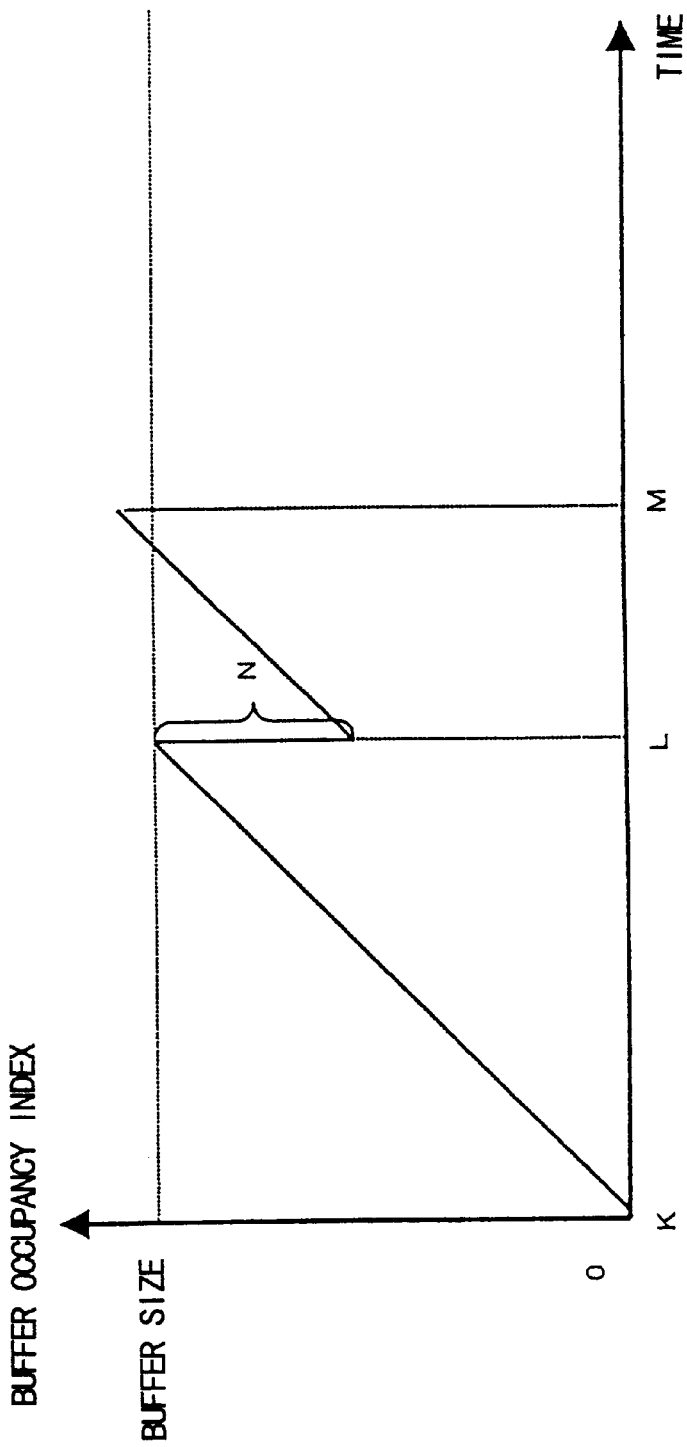
FIG. 3 shows an example of an overflow at VBV.
Figure 4:
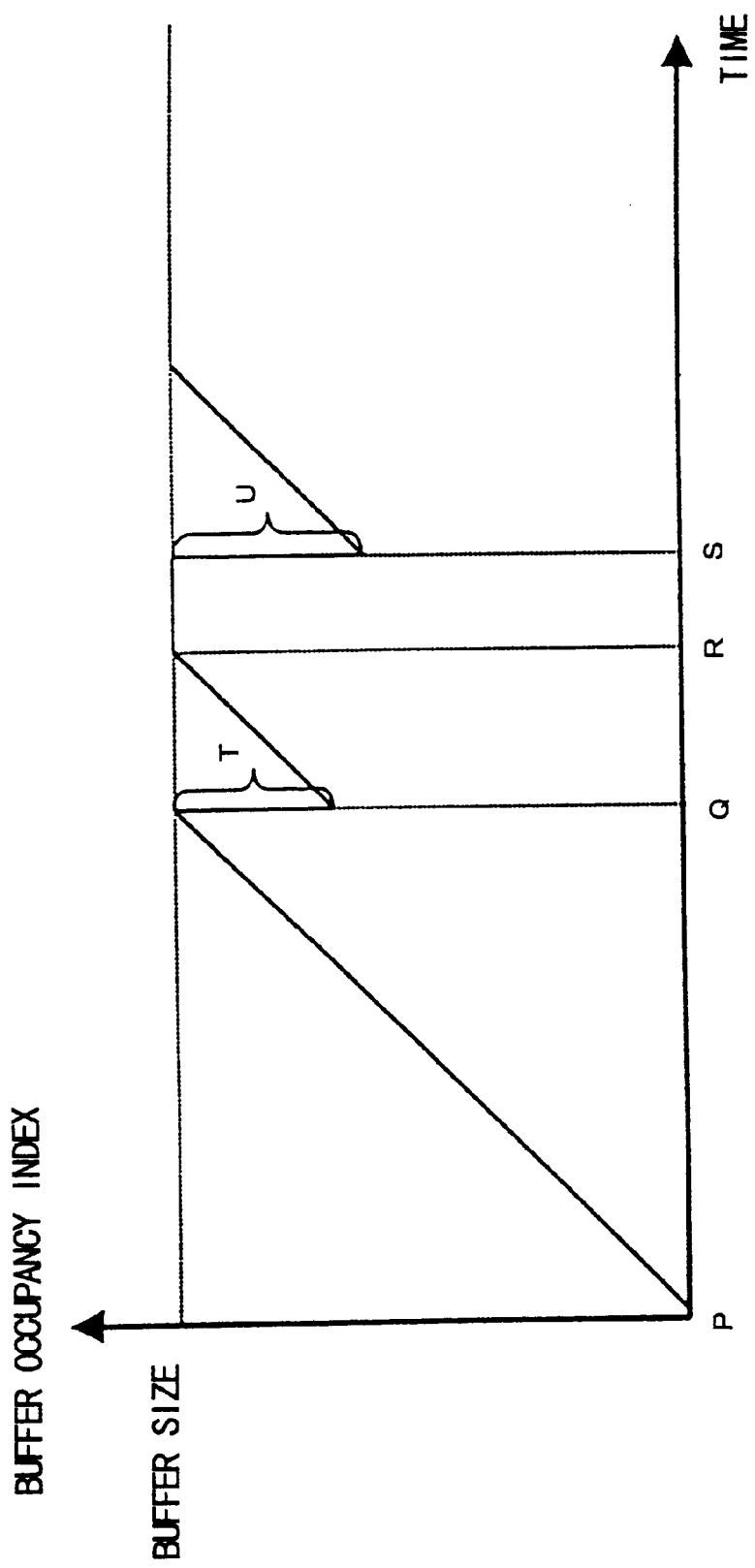
FIG. 4 shows an example of the buffer occupancy index change with time in a variable bit rate encoding mode.
Figure 5:
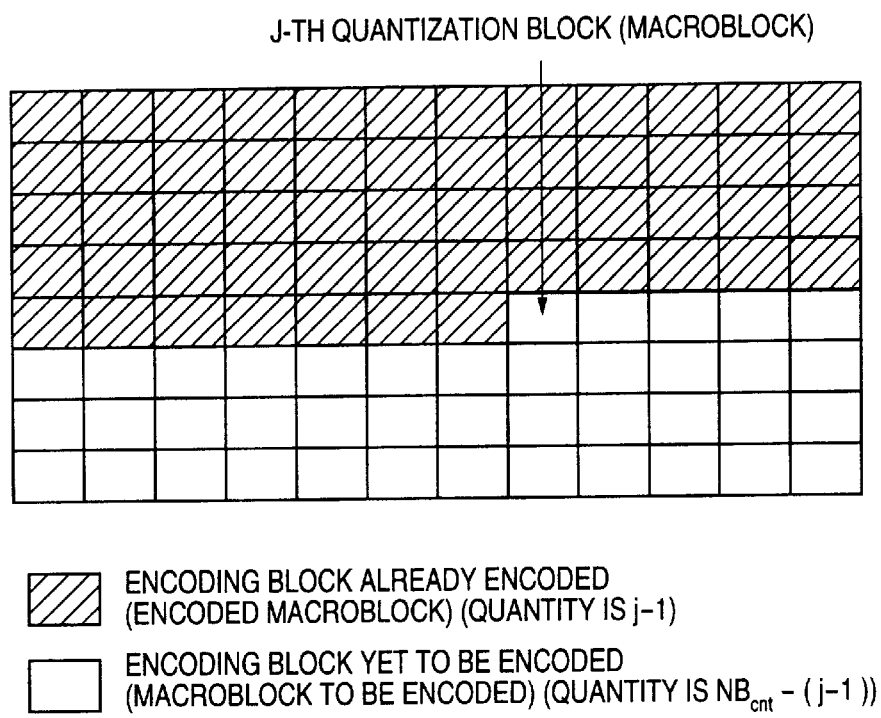
FIG. 5 shows an example of an encoding block (macroblock) in an image frame.
Figure 6:
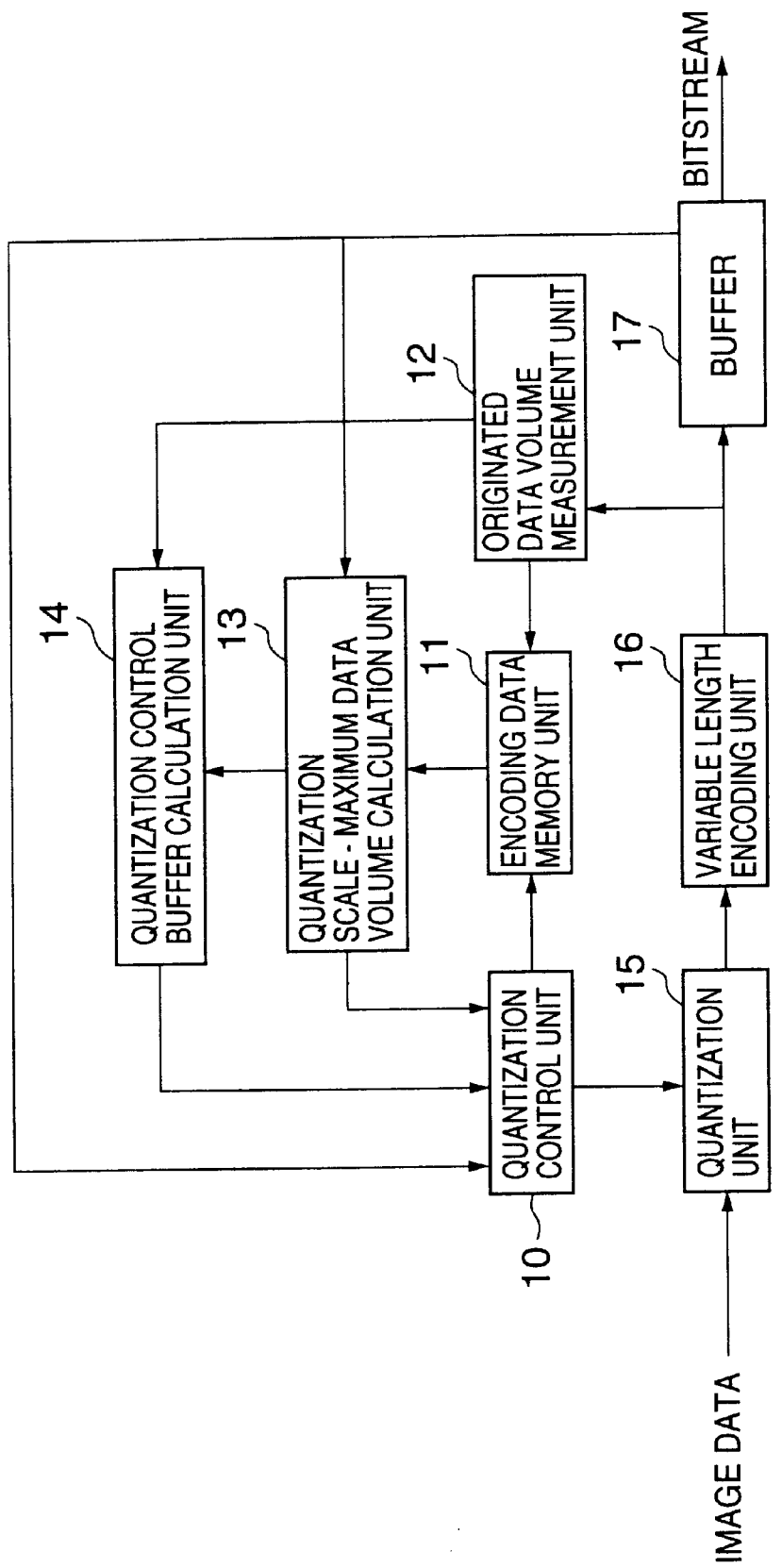
FIG. 6 is an example block diagram to describe the principle of the present invention.

FIG. 6 is a sample block diagram to describe the principle of the present invention. A quantization unit 15 receives an image data and quantizes the image data by a quantization scale that is determined by a quantization control unit 10. Further, the quantized image data is supplied to a variable length encoding unit 16. The variable length encoding unit 16 generates a bitstream by encoding the quantized image data. The bitstream is supplied to an originated data volume measurement unit 12 and a buffer 17.

The buffer 17 stores the bitstream thus provided and calculates a buffer occupancy index which is provided to the quantization control unit 10 and a quantization scale—maximum data volume calculation unit 13. The originated data volume measurement unit 12 measures the originated data volume of the bitstream provided, the result of which is provided to a quantization control buffer calculation unit 14 and an encoding data memory 11.

The encoding data memory 11 stores the originated data volume supplied from the originated data volume measurement unit 12 and the quantization scale used in encoding as supplied from the quantization control unit 10, and provide the originated data volume and the quantization scale to the quantization scale—maximum data volume calculation unit 13.

The quantization scale—maximum data volume calculation unit 13 calculates the maximum data volume of the encoding target image frame and the quantization scale for the encoding block (macroblock), based on the quantization scale and the originated data volume of an encoded image frame as provided from the encoding data memory 11 and the buffer occupancy index as provided from the buffer 17. The maximum data volume and the quantization scale are provided to the quantization control unit 10, Here, the maximum data volume is not a target value for the originated data of the encoding target image frame, but it is a maximum originated data volume that observes a limit of a maximum encoding bit rate which shall not collapse the VBV buffer.

The quantization control buffer calculation unit 14 calculates a quantization scale based on the originated data volume advised from the originated data volume measurement unit 12 and the maximum data volume of the encoding target image as advised from the quantization scale—maximum data volume calculation unit 13, and advises the quantization scale to the quantization control unit 10. At the quantization control unit 10, the quantization scale advised from the quantization control buffer calculation unit 14 is compared with the quantization scale advised from the quantization scale—maximum data calculation unit 13, the larger of which is selected and advised to the quantization unit 15.

Figure 7:
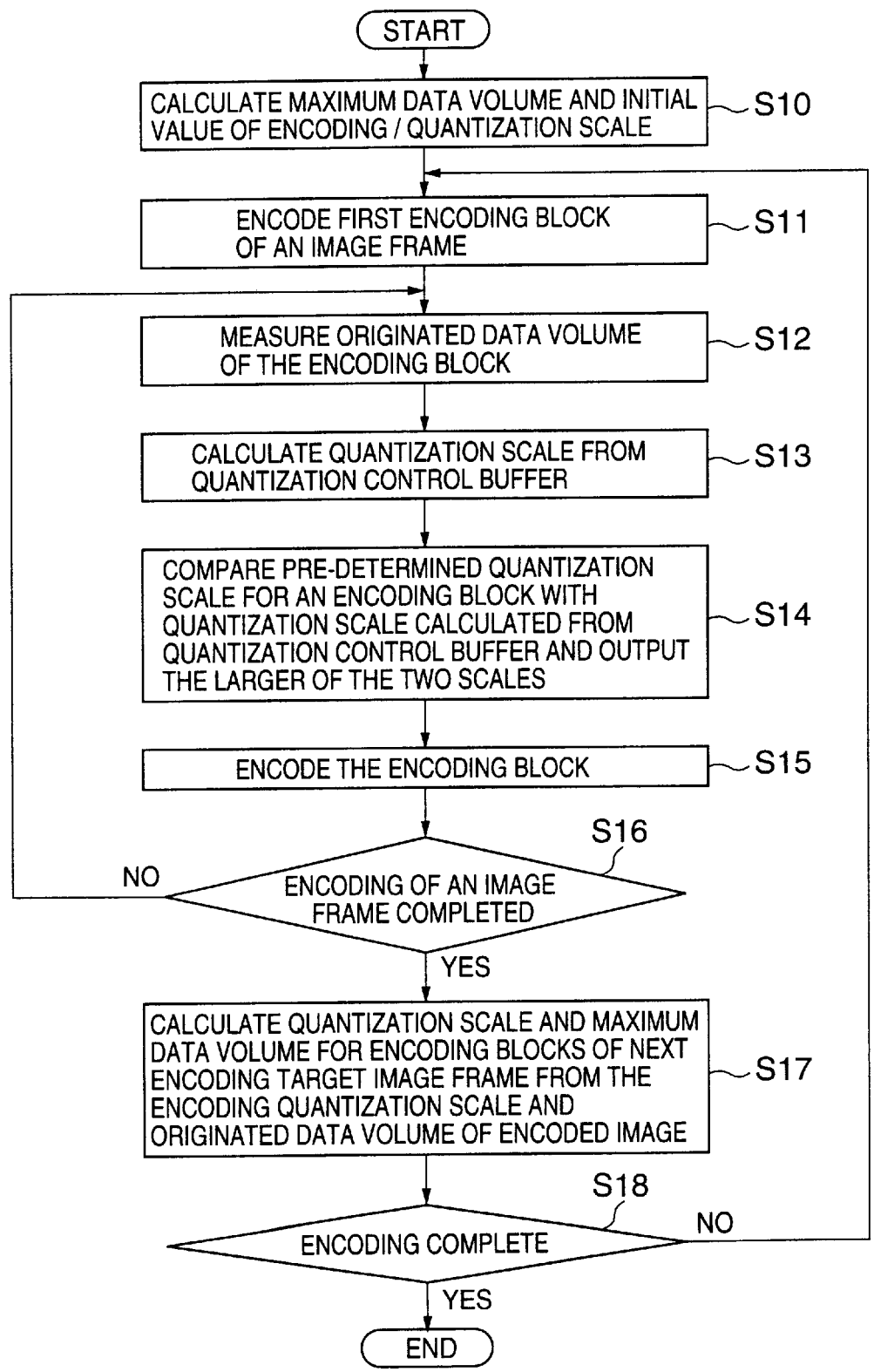
FIG. 7 is a flow chart to describe an example of the process of the principle.

An explanation continues on FIG. 6 with reference to FIG. 7 which is an example flow chart to describe a process performed by the units in FIG. 6. At a step S10, the quantization scale—maximum data volume calculation unit 13 calculates the maximum data volume and an initial value of the quantization scale. The initial value is provided to the quantization control unit 10 as the quantization scale for a first image frame to be encoded. Here, the maximum data volume is not a target value for the originated data of the encoding target image frame, but it is a maximum originated data volume that observes a limit of a maximum encoding bit rate which shall not collapse the VBV buffer.

Pursuant to the step S10, the process proceeds to a step S11, wherein a first encoding block (macroblock) of the image frame is quantized by the quantization unit 15 using the initial value of the quantization scale. Then, the quantization unit 15 provides thus quantized image data to the variable length encoding unit 16. The variable length encoding unit 16 generates a bitstream by encoding the quantized image data. The bitstream is provided to the originated data volume measurement unit 12 and the buffer 17.

Pursuant to the step S11, the process proceeds to a step S12 where the originated data measurement unit 12 measures the originated data volume of the supplied bitstream, and advises the originated data volume to the quantization control buffer calculation unit 14 and the encoding data memory 11. Pursuant to the step S12, the process proceeds to a step S13 where the quantization control buffer calculation unit 14 calculates the quantization scale using the aforementioned formulae (1) through (4), and advises the quantization scale to the quantization control unit 10. The quantization scale calculated by the quantization control buffer calculation unit 14 is a minimum quantization scale that observes the maximum data volume. Therefore, so long as a quantization is performed at a greater quantization scale than the minimum quantization scale, a collapse of the quantization control buffer and a violation in the maximum encoding bit rate are prevented from occurring.

Pursuant to the step S13, the process proceeds to a step S14 where the quantization control unit 10 compares the quantization scale provided from the quantization control buffer calculation unit 14 with the quantization scale provided from the quantization scale—maximum data volume calculation unit 13. The larger of the two scales is selected and provided to the quantization unit 15. Then the process proceed to a step S15, pursuant to the step S14, where the quantization unit 15 quantizes an encoding block (macroblock) based on the quantization scale provided from the quantization control unit 10.

Pursuant to the step S15, the process proceeds to a step S16. If encoding of a frame has finished (YES in the step S16), then the process proceeds to a step S17. If encoding of a frame has not finished (NO in the step S16), then the steps S12 through S16 are repeated.

In the step S17, the quantization scale—maximum data volume calculation unit 13 calculates a quantization scale and a maximum data volume for each encoding block (macroblock) of the next encoding target image frame based on the quantization scale for the previously encoded image and the maximum data volume. Thus calculated maximum data volume is advised to the quantization control buffer calculation unit 14. Pursuant to the step S17, the process proceeds to a step S18. If the encoding process is finished (YES at the step S18), then the process ends. If the encoding process has not finished (NO at the step S18), then the steps S11 through S18 are repeated.

As described above, when the quantization scale—maximum data volume calculation unit 13 calculates the maximum data volume, it also predicts a degree of difficulty in compressing the next image frame and determines the maximum data volume and the quantization scale for each encoding block (macroblock) based on the degree of the compression difficulty. When an image changes suddenly from a frame that is easy to compress to another that is hard to compress, the degree of the difficulty in the image frame compression predicted by the quantization scale—maximum data volume calculation unit 13 will be low.

When the degree of the difficulty in the image frame compression is actually high and the image frame is compressed based on the quantization scale pre—calculated by the quantization scale—maximum data volume calculation unit 13, then the originated data volume will be greater than the maximum data volume to possibly collapse the VBV buffer. In order to prevent the collapse at the VBV buffer, the minimum quantization scale that observes the maximum data volume calculated by the quantization control buffer calculation unit 14 for each encoding block (macroblock) encoded is compared with the quantization scale calculated by the quantization scale—maximum data volume calculation unit 13 prior to encoding the image frame. The greater of the two quantization scales is adopted for encoding.

Accordingly, if there is no sudden change in the compression difficulty in image frames, encoding is performed based on the quantization scale as pre-calculated by the quantization scale—maximum data volume calculation unit 13. On the other hand, if there is a sudden change from an easy-to-compress frame to a hard-to-compress frame and there is a possibility that the originated data volume may exceed the maximum data volume, then, the minimum quantization scale that observes the maximum originated data volume as calculated by the quantization control buffer calculation unit 14 is used so that the VBV buffer collapse and the maximum encoding bit rate violation are prevented.

Figure 8:
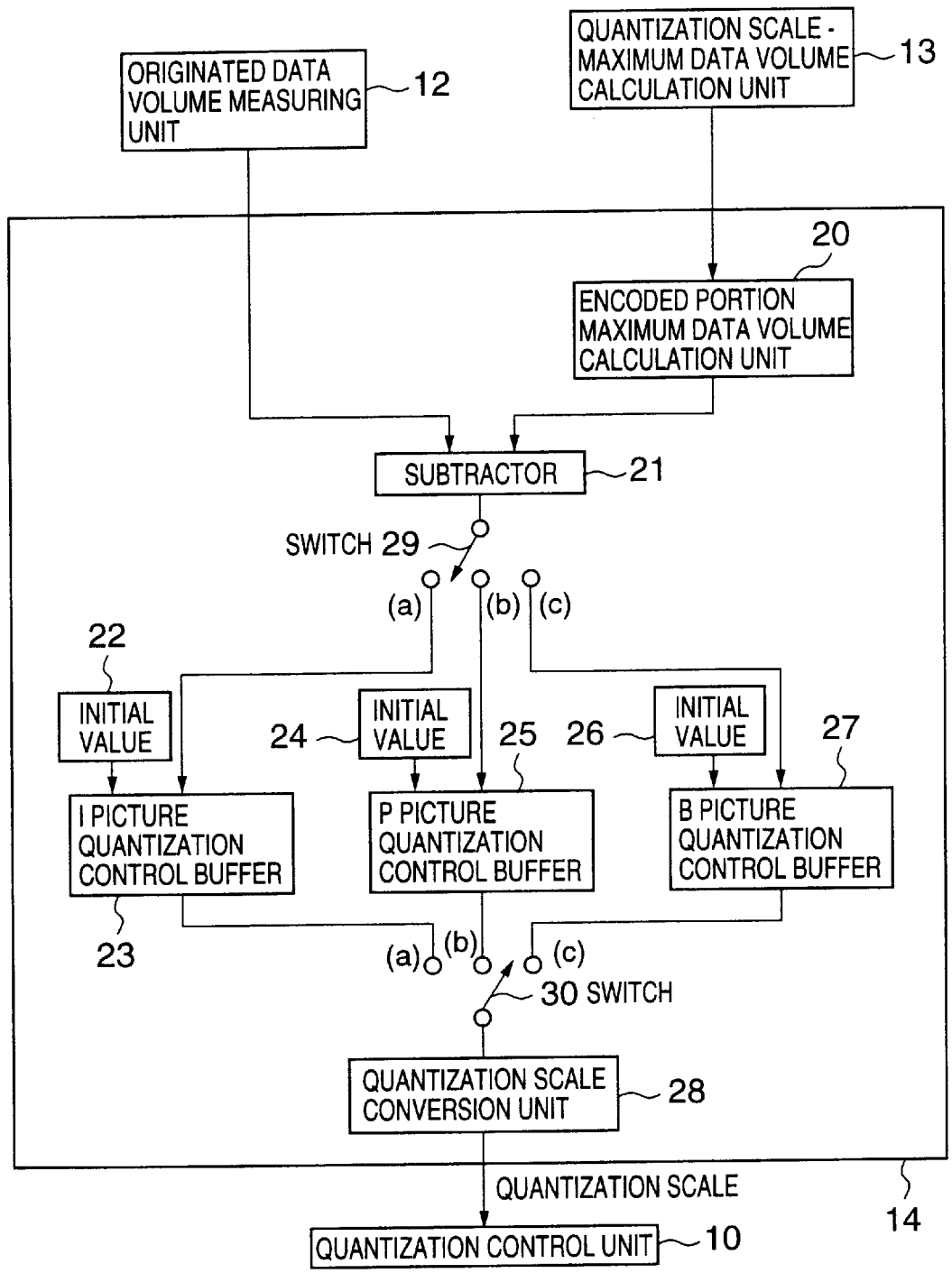
FIG. 8 shows an example of a structure of the quantization control buffer calculation unit.

FIG. 8 shows a sample structure of the quantization control buffer calculation unit 14 which includes an encoded portion maximum data volume calculation unit 20, a subtractor 21, initial value storage units 22, 24 and 26, an I picture quantization control buffer 23, a P picture quantization control buffer 25, a B picture quantization control buffer 27, a quantization scale conversion unit 28, and switches 29 and 30.

The encoded portion maximum data volume calculation unit 20 receives the maximum data volume for an encoding target image frame from the quantization scale—maximum data volume calculation unit 13. Further, The encoded portion maximum data volume calculation unit 20 calculates data volume that corresponds to the encoded portion of the maximum data volume.

The subtractor 21 calculates a difference between the originated data volume as provided by the originated data volume measurement unit 12 and the data volume for the encoded portion of the maximum data volume as provided from the encoded portion maximum data volume calculation unit 20. The subtractor 21 is connected to one of the I picture quantization control buffer 23, the P picture quantization control buffer 25 and the B picture quantization control buffer 27 via the switch 29.

The switch 29 is connected to (a) when a picture type of the encoding target image frame is I picture, to (b) when the picture type of the encoding target image frame is P picture and to (c) when the picture type of the encoding target image frame is B picture.

The initial value storage unit 22 provides an initial value to the I picture quantization control buffer 23. Similarly, the initial value storage units 24 and 26 provide initial values to the P picture quantization control buffer 25 and the B picture quantization control buffer 27, respectively. The I picture quantization control buffer 23, the P picture quantization control buffer 25 and the B picture quantization control buffer 27 add the difference as provided by the subtractor 21 to the respective initial values as stored in the respective quantization control buffer at a start of picture encoding.

The I picture quantization control buffer 23, the P picture quantization control buffer 25 and the B picture quantization control buffer 27 are connected to the quantization scale conversion unit 28 via the switch 30. Similarly to the switch 29, the switch 30 is connected to (a) when a picture type of the encoding target image frame is I picture, to (b) when the picture type of the encoding target image frame is P picture and to (c) when the picture type of the encoding target image frame is B picture. The quantization scale conversion unit 28 calculates a quantization scale from values stored in the I picture quantization control buffer 23, the P picture quantization control buffer 25 and the B picture quantization control buffer 27, and provides the quantization scale to the quantization control unit 10.

Figure 9:
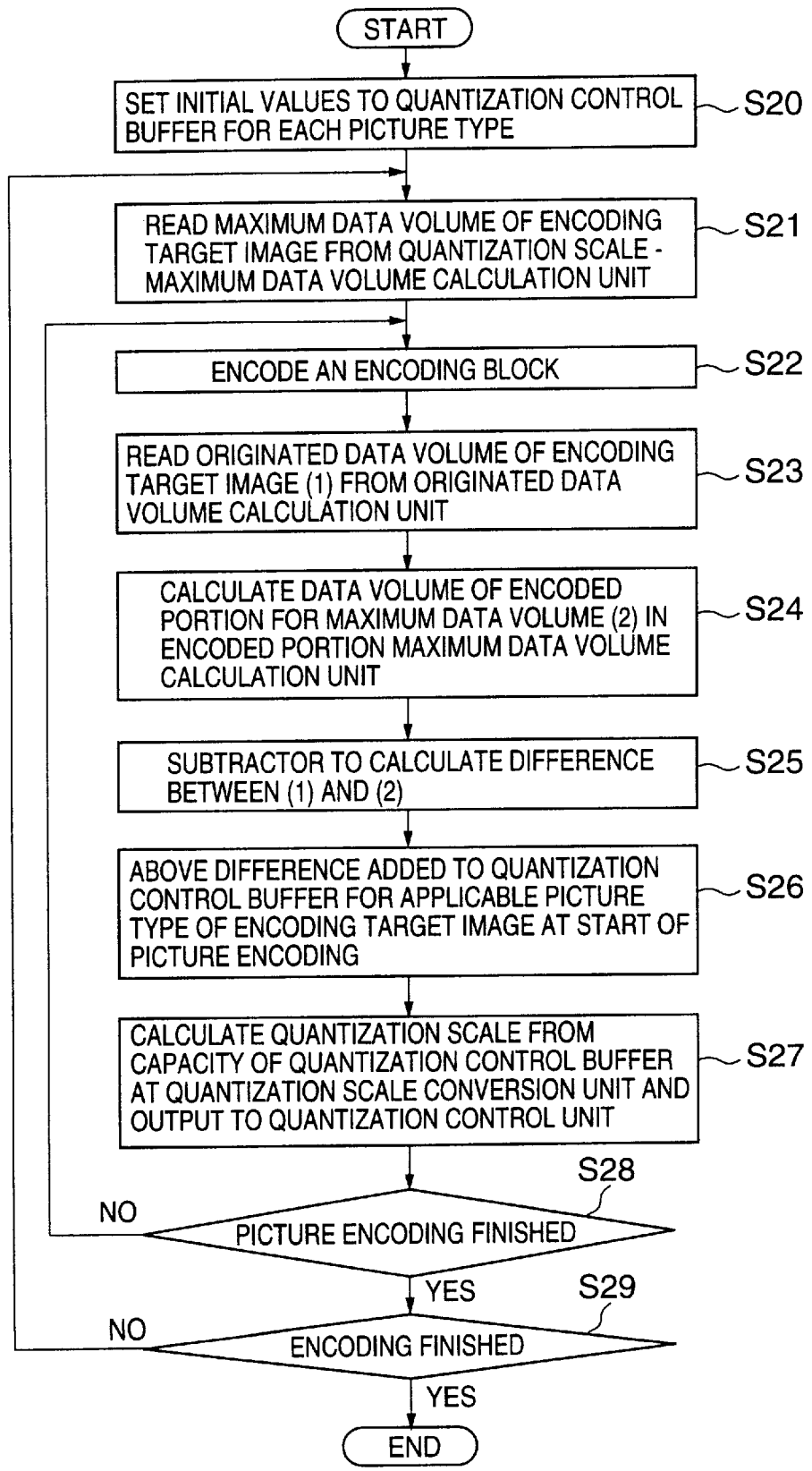
FIG. 9 shows a flow chart to describe an example of the quantization control buffer calculation unit.

Further explanation follows on FIG. 8 with reference to FIG. 9 that is a flow chart describing a sample process of the quantization control buffer calculation unit 14. In a step S20, the initial value storage units 22, 24 and 26 provide initial values to I picture quantization control buffer 23, the P picture quantization control buffer 25 and the B picture quantization control buffer 27, respectively.

Pursuant to the step S20, the process proceeds to a step S21 where the encoded portion maximum data volume calculation unit 20 receives the maximum data volume for an encoding target image from the quantization scale—maximum data volume calculation unit 13. Pursuant to the step S21, the process proceeds to a step S22 where a first encoding block (macroblock) is quantized and encoded by the quantization unit 15 and the variable length encoding unit 16, respectively. Pursuant to the step S22, the process proceeds to a step S23 where the subtractor 21 receives the originated data volume of the encoding target image frame from the originated data volume measurement unit 12.

Pursuant to the step S23, the process proceeds to a step 324 where the encoded portion maximum data volume calculation unit 20 calculates data volume of an encoded portion of the maximum data volume and provides the data volume of the encoded portion of the maximum data volume to the subtractor 21. Pursuant to the step S24, the process proceeds to a step S25 where the subtractor 21 calculates a difference between the originated data volume from the originated data volume measurement unit 12 and the data volume of the encoded portion of the maximum data volume provided from the encoded portion maximum data volume calculation unit 20.

Pursuant to the step S25, the process proceeds to a step S26 where the subtractor 21 that is connected to one of the I picture quantization control buffer 23, the P picture quantization control buffer 25 and the B picture quantization control buffer 27, according to the type of a picture to be encoded provides the calculated difference to one of the I picture quantization control buffer 23, the P picture quantization control buffer 25 and the B picture quantization control buffer 27. Further, the I picture quantization control buffer 23, the P picture quantization control buffer 25 and the B picture quantization control buffer 27 add the difference value provided from the subtractor 21 to their respective quantization control buffer value at the starting time of the encoding.

Pursuant to the step S26, the process proceeds to a step S27 where the quantization scale conversion unit 28 which is connected to one of the I picture quantization control buffer 23, the P picture quantization control buffer 25 and the B picture quantization control buffer 27 in accordance with the type of the picture receives a value from one of the I picture quantization control buffer 23, the P picture quantization control buffer 25 and the B picture quantization control buffer 27. The quantization scale conversion unit 28 calculates the quantization scale from a value received from one of the I picture quantization control buffer 23, the P picture quantization control buffer 25 and the B picture quantization control buffer 27. The quantization scale thus calculated is output to the quantization control unit 10.

Pursuant to the step S27, the process proceeds to a step S28. If encoding of a picture has been complete (YES at S28), then the process proceeds to a step S29. If encoding of a picture has not been complete (NO at S28), then the steps S22 through S28 are repeated. Further, if encoding is complete in the step S29 (YES at S29), then the encoding process ends. If the encoding process is not finished (NO at S29), then the steps S21 through S29 are repeated.

Figure 10:
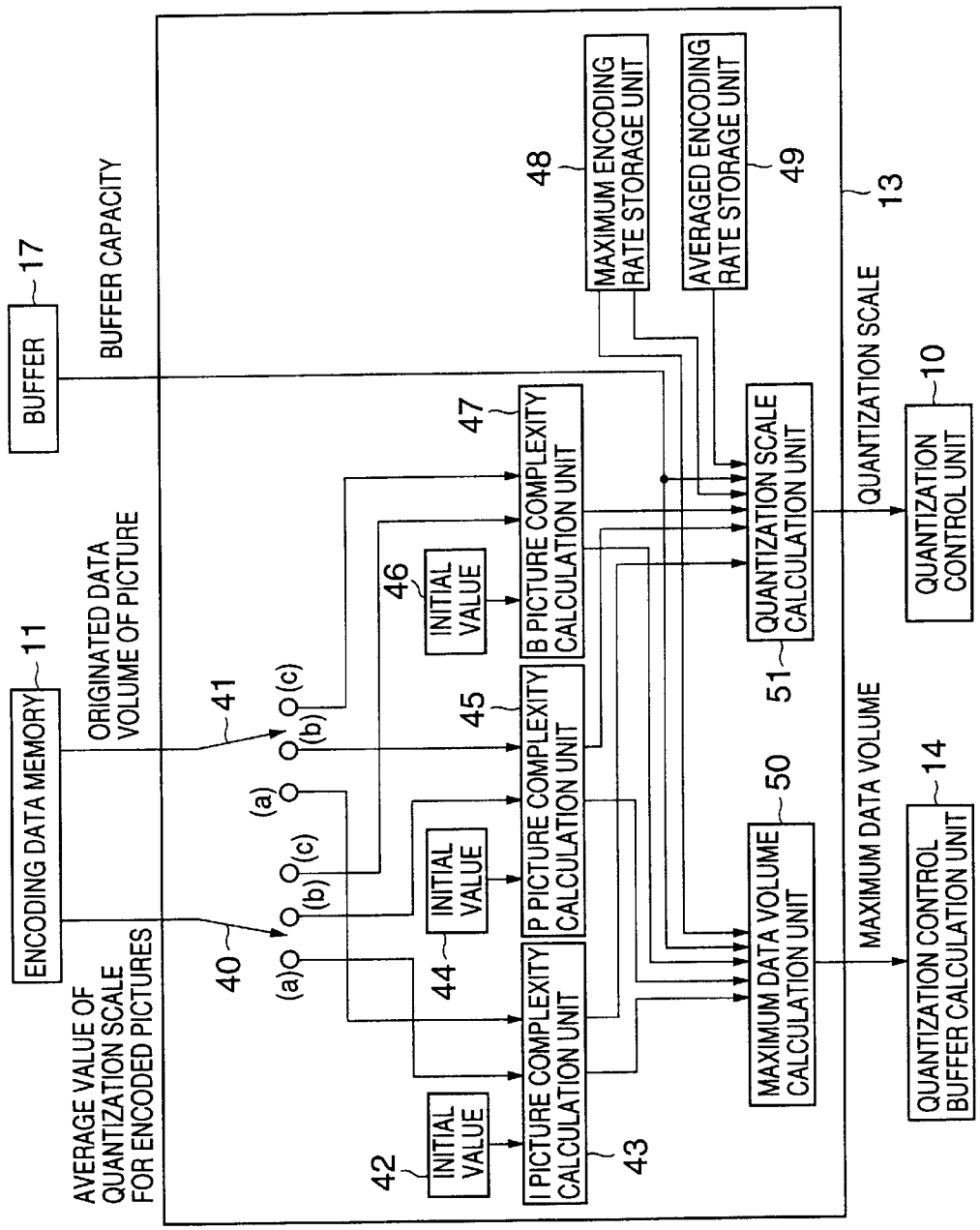
FIG. 10 is an example of a structure of the quantization scale—maximum data volume calculation unit.

FIG. 10 shows an example structure of the quantization scale—maximum data volume calculation unit 13 that includes switches 40 and 41, initial value storage units 42, 44 and 46, an I picture image complexity calculation unit 43, a P picture image complexity calculation unit 45, a B picture image complexity calculation unit 47, a maximum coding bit rate storage unit 48, an average encoding bit rate storage unit 49, a maximum data calculation unit 50 and a quantization scale calculation unit 51.

The I picture image complexity calculation unit 43, the P picture image complexity calculation unit 45, the B picture image complexity calculation unit 47 are connected to the encoding data memory 11 via the switches 40 and 41. The switches 40 and 41 connect to (a) when the picture type of the encoding target image frame is an I picture, to (b) when the picture type of the encoding target image frame is a P picture and to (c) when the picture type of the encoding target image frame is a B picture.

The initial value storage unit 42 provides an initial value to the I picture image complexity calculation unit 43. Similarly, the initial value storage units 44 and 46 provide initial values to the P picture image complexity calculation unit 45 and the B picture image complexity calculation unit 47, respectively. The I picture image complexity calculation unit 43, the P picture image complexity calculation unit 45 and the B picture image complexity calculation unit 47 calculate an image complexity index based on an average value of the quantization scale for the encoded picture as provided from the encoding data memory 11 and the originated data volume of the encoding target image frame. The image complexity index is output to the maximum data volume calculation unit 50 and to the quantization scale calculation unit 51.

The maximum encoding bit rate storage unit 48 provides a maximum encoding bit rate to the maximum data volume calculation unit 50 and the quantization scale calculation unit 51. The averaged encoding bit rate storage unit 49 provides an averaged encoding bit rate to the quantization sale calculation unit 51. Further, the buffer 17 provides a buffer occupancy index to the maximum data volume calculation unit 50 and the quantization scale calculation unit 51.

The maximum data volume calculation unit 50 calculates the maximum data volume of an encoding target image frame based on the image complexity index, the buffer occupancy index and the maximum encoding bit rate. Thus calculated maximum data volume is output to the quantization control buffer calculation unit 14. Further, the quantization scale calculation unit 51 calculates the quantization scale of the encoding target image frame based on the image complexity index, the buffer occupancy index, the maximum encoding bit rate and the averaged encoding bit rate. Thus calculated quantization scale is output to the quantization control unit 10.

Figure 11:
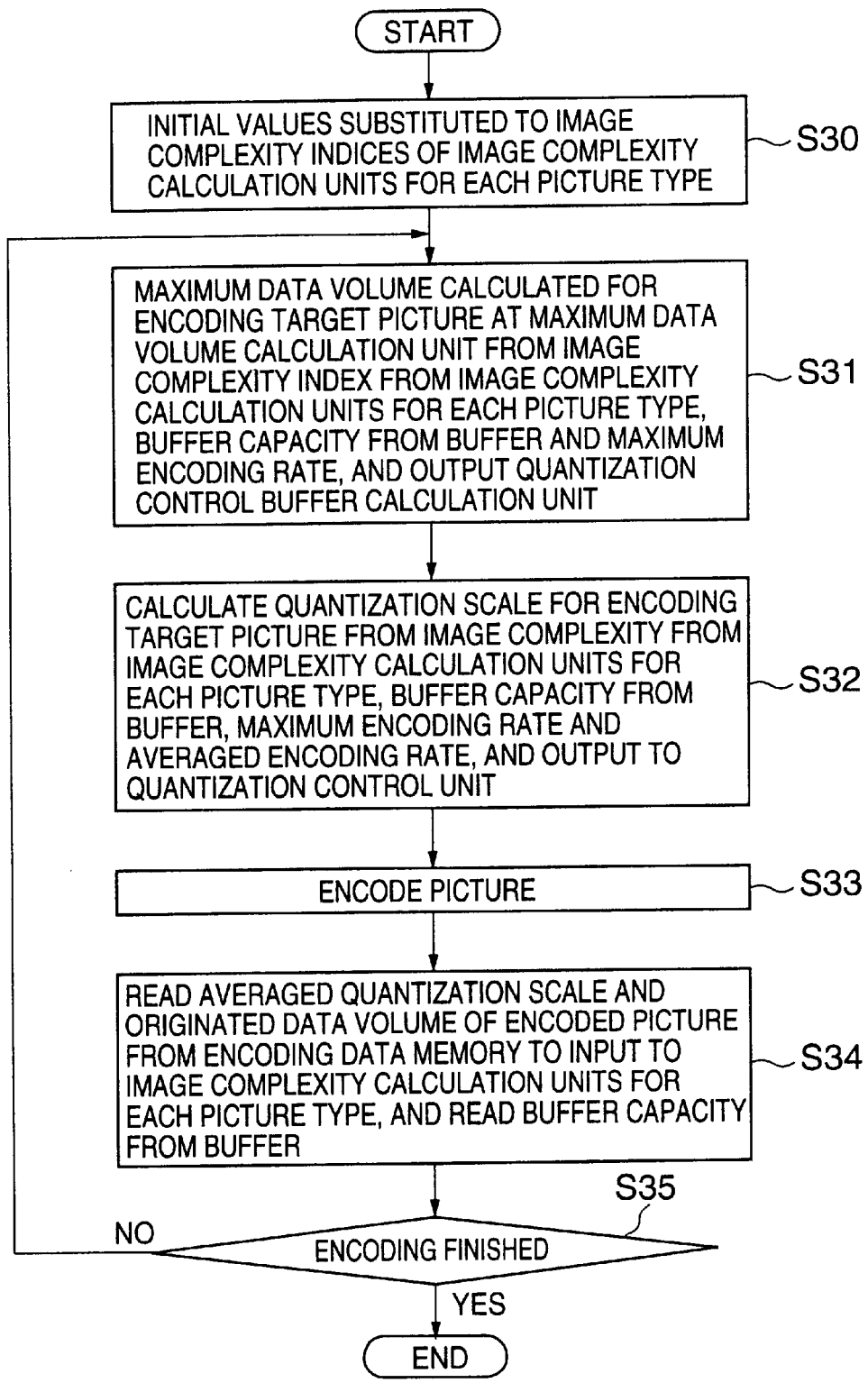
FIG. 11 is a flow chart to describe an example of the process of the quantization scale—maximum data volume calculation unit.

Further explanation on FIG. 10 is presented with reference to FIG. 11 that is a flow chart of a sample process handled by the quantization scale—maximum data volume calculation unit 13. In a step S30, the initial value storage units 42, 44 and 46 provide initial values to the I picture image complexity calculation unit 43, the P picture image complexity calculation unit 45, and the B picture image complexity calculation unit 47.

Pursuant to the step S30, the process proceeds to a step S31 in which the maximum data volume calculation unit 50 receives image complexity indices from the I picture image complexity calculation unit 43, the P picture image complexity calculation unit 45, and the B picture image complexity calculation unit 47, a buffer occupancy index from the buffer 17 and a maximum encoding bit rate from the maximum encoding bit rate storage 48. Based on the image complexity indices, the buffer occupancy index and the maximum encoding bit rate, the maximum data volume calculation unit 50 calculates the maximum data volume which is output to the quantization control buffer calculation unit 14.

Pursuant to the step S31, the process proceeds to a step S32 in which the quantization scale calculation unit 51 receives the image complexity indices from the I picture image complexity calculation unit 43, the P picture image complexity calculation unit 45, and the B picture image complexity calculation unit 47, buffer occupancy index from the buffer 17, the maximum encoding bit rate from the maximum encoding bit rate storage unit 48 and the averaged encoding bit rate from the averaged encoding bit rate storage unit 49. The quantization scale calculation unit 51, then calculates the quantization scale for the encoding target image frame based on the image complexity indices, the buffer occupancy index, the maximum encoding bit rate and the averaged encoding bit rate. The quantization scale is output to the quantization control unit 10.

Pursuant to the step S32, the process proceeds to a step S33 where the encoding target image frame is quantized and encoded at the quantization unit 15 and the variable length encoding unit 16, respectively. Pursuant to the step S33, the process proceeds to a step S34 where the I picture image complexity calculation unit 43, the P picture image complexity calculation unit 45, and the B picture image complexity calculation unit 47 receive the averaged quantization scale for an encoded image frame and the originated data volume from the encoding data memory 11. Further, the maximum data volume calculation unit 50 and the quantizing scale calculation unit 51 receive the buffer occupancy index from the buffer 17.

Pursuant to the step S34, the process proceeds to a step S35 where if the encoding process is finished (YES at S35), then the process ends, and if the encoding process has not finished (NO at S35), then the steps S31 through S35 are repeated.

Figure 12:
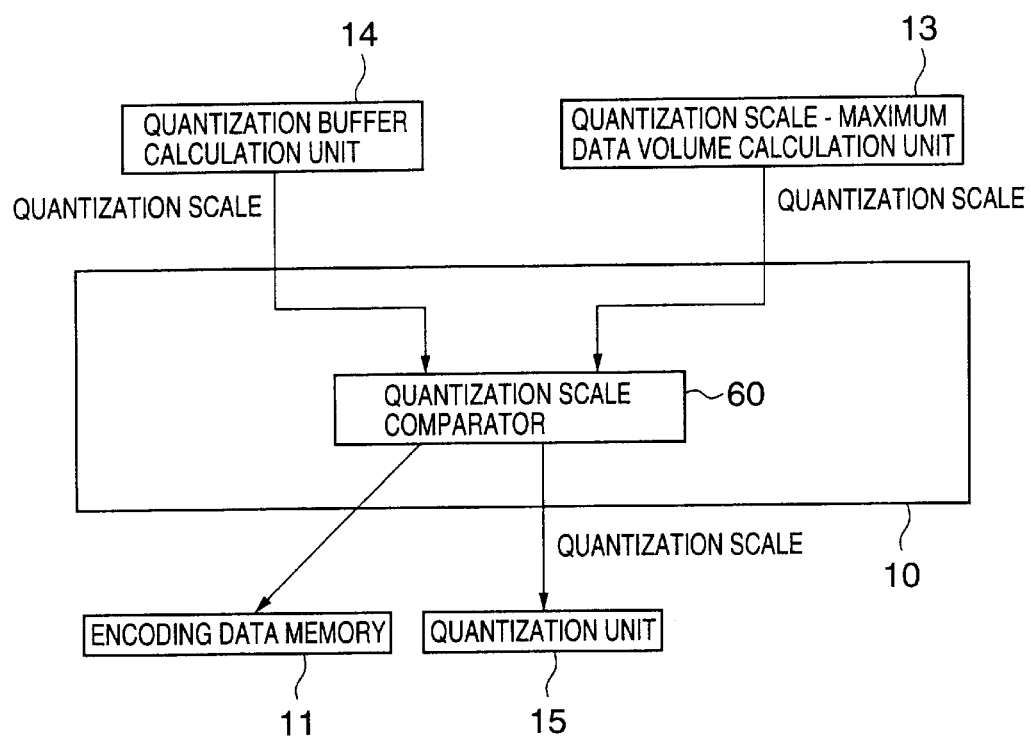
FIG. 12 show and example of the structure of the quantization control unit.

FIG. 12 shows a sample structure of the quantization control unit 10 which includes a quantization scale comparator 60. The quantization scale comparator 60 receives the quantization scale from the quantization control buffer calculation unit 14 and the quantization scale from the quantization scale—maximum data volume calculation unit 13. The quantization scale comparator 60 compares the quantization scale provided from the quantization control buffer calculation unit 14 with the quantization scale provided from the quantization scale—maximum data volume calculation unit 13. The greater of the two quantization scales is output to the encoding data memory 11 and the quantization unit 15.

Figure 13:
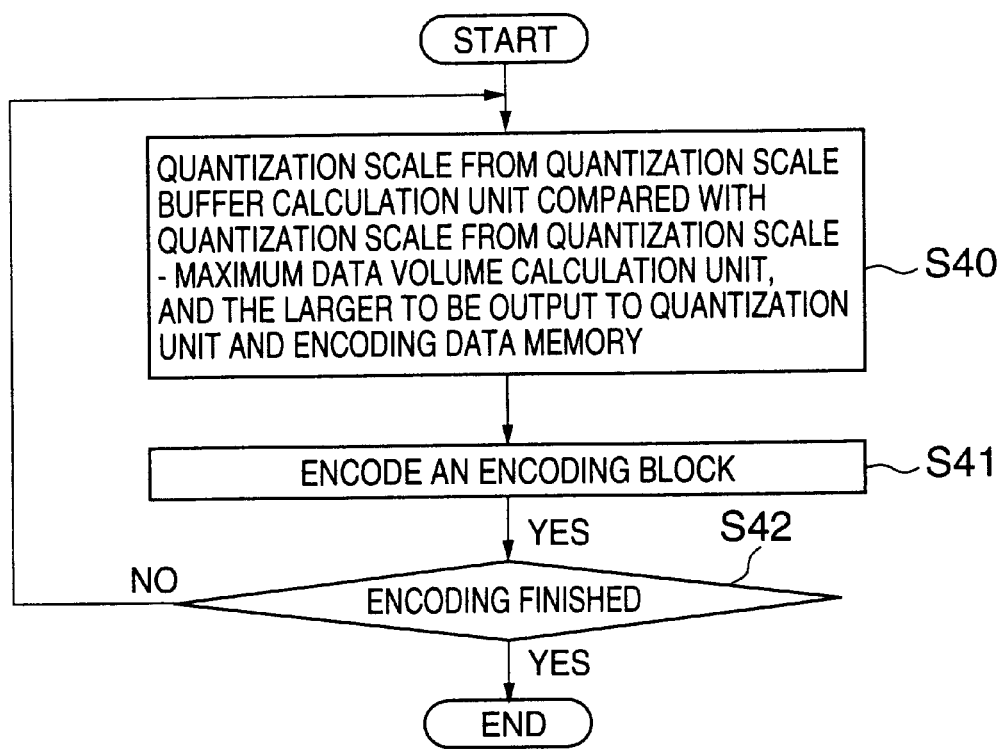
FIG. 13 is a flow chart to describe an example of the process in the quantization control unit.

Further explanation of FIG. 12 will be made with reference to FIG. 13 which is a flow chart of a sample process performed by the quantization control unit. In a step S40, the quantization scale comparator 60 compares the quantization scale provided from the quantization control buffer calculation unit 14 with the quantization scale provided by the quantization scale—maximum data volume calculation unit 13, the greater of which is output to the encoding data memory 11 and the quantization unit 15.

Pursuant to the step S40, the process proceeds to a step S41 where an encoding block (macroblock) of an image frame is quantized based on the quantization scale provided from the quantization control unit 10 and encoded at the quantization unit 15 and the variable length encoding unit 16, respectively. Then the process proceeds from the step S41 to a step S42 where if the encoding process is finished (YES at S42), the process ends, otherwise (NO at S42) the steps S40 through S42 are repeated.

Figure 14:
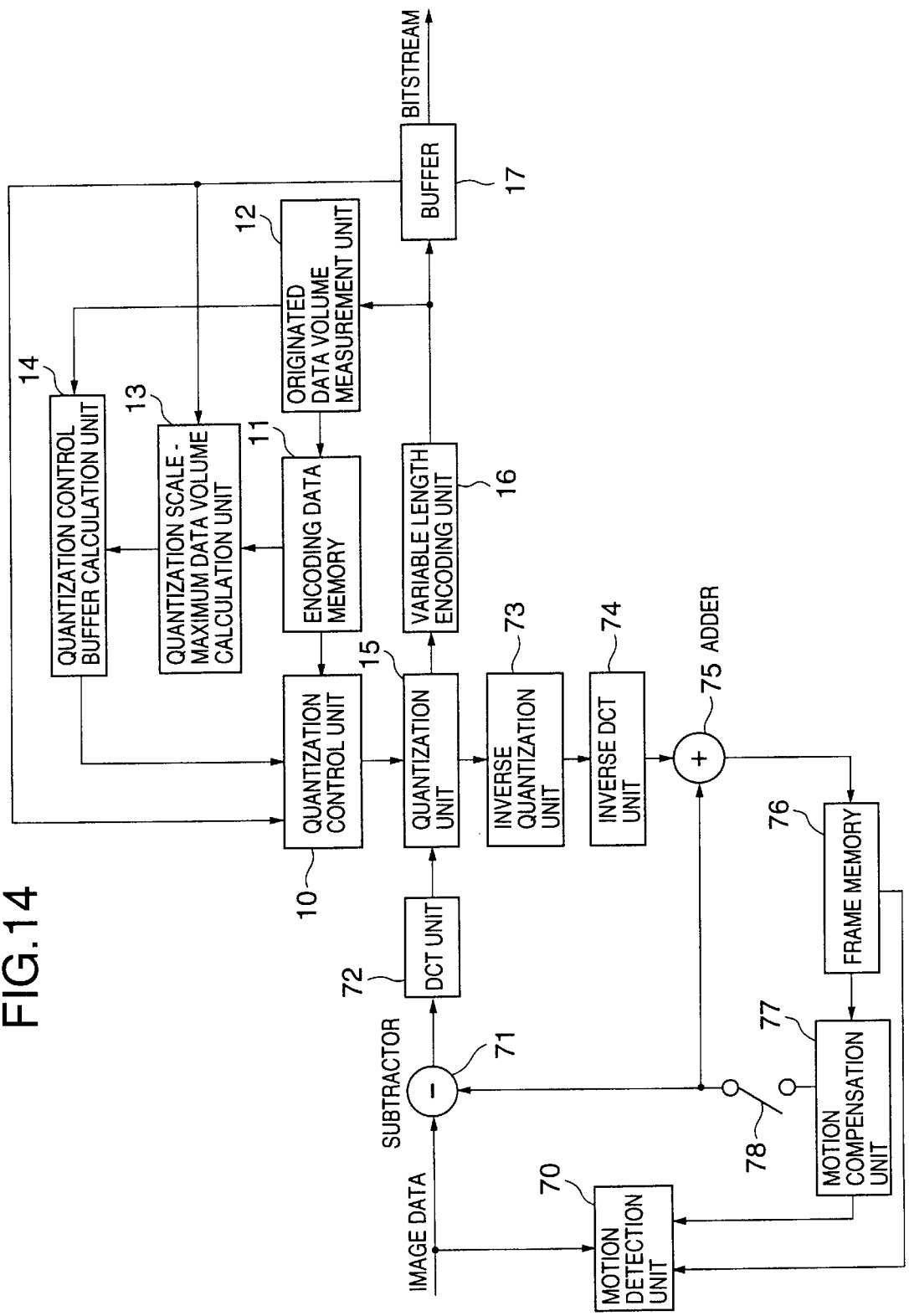
FIG. 14 shows a structure of a sample embodiment of the image signal encoding apparatus of the present invention.

FIG. 14 shows a structure of an example of embodiments of the image signal encoding apparatus of the present invention. Image data of an encoding block (macroblock) that is input to the image signal encoding apparatus of the present invention is provided to a motion detection unit 70 and a subtractor 71. If the image data for the encoding block (macroblock) is an image frame that is to be intraframe encoded, for example an I picture, then a switch 78 will be opened so that the image data for the encoding unit provided to the subtractor 71 is provided to a DCT unit 72. Here, the encoding block (macroblock) is, for example, a rectangular area made of 16×16 pixels.

The DCT unit 72 receives the image data of the encoding block (macroblock) from the subtractor 71, converts the data to DCT coefficients which are coefficients in the frequency domain by the DCT (discrete cosine transform) and outputs to the quantization unit 15. The quantization unit 15 quantizes the DCT coefficients based on the quantization scale provided from the quantization control unit 10. Thus quantized DCT coefficients are provided to the variable length encoding unit 16 and an inverse quantization unit 73.

The inverse quantization unit 73, upon receiving the quantized DCT coefficients, performs inverse quantization of the quantized DCT coefficients which is provided to an inverse-DCT unit 74. The inverse-DCT unit 74, upon receipt of the DCT coefficients from the inverse quantization unit 73, converts the DCT coefficients in an inverse direction, using the inverse-DCT transform, and provides to an adder 75. Because the switch 78 is open if the encoding block (macroblock) of the input image data is an image frame that is to be intraframe encoded, for example an I picture. Thus the image data of the encoding block (macroblock) provided to the adder 75 is sent to a frame memory 76. The frame memory 76 stores the image data of the encoding block supplied from the adder 75 as a reference image.

In case that the image data of the encoding block (macroblock) input is an image frame to be interframe encoded, for example P picture and B picture, the switch 78 is closed. The motion detection unit 70 selects an image data of an encoding block (macroblock) that is the most resembled to the input image data from reference images stored in the frame memory 76. Motion vector of the selected image data is provided to a motion vector compensation unit 77.

The motion compensation unit 77 selects the image data of the encoding block (macroblock), to which the motion vector supplied from the motion detection unit 70 refers, from the frame memory 76, and supplies the image data to the subtractor 71. The subtractor 71 calculates a differential data between the image data for the encoding block (macroblock) and the image data for an encoding unit (macroblock) provided from the motion compensation unit 77 via the switch 78. The differential data is provided to the DCT unit 72.

The DCT unit 72 converts the differential data provided from the subtractor 71 into DCT coefficients that are coefficients in the frequency domain by means of the DCT (discrete cosine transform), and outputs to the quantization unit 15. The quantization unit 15 quantizes the DCT coefficients by the quantization scale supplied from the quantization control unit 10, as described above the quantized DCT coefficients are supplied to the variable length encoding unit 16 and the inverse quantization unit 73.

The inverse quantization unit 73, upon receiving the quantized DCT coefficients, inverses the quantized DCT coefficients and provide them to the inverse-DCT unit 74. The inverse-DCT unit 74, upon receiving the DCT coefficients from the inverse quantization unit 73, performs inverse-DCT transform of the DCT coefficients, and send them to the adder 75. Because the switch 78 is closed if the input differential data is that of the interframe encoding, such as P picture and B picture, then, the adder 75 adds the image data of the encoding block (macroblock) provided from the motion compensation unit 77 via the switch 78 to the differential data provided from the inverse-DCT unit 74, and sends the result to the frame memory 76. The frame memory 76 stores the added data provided from the adder 75 as a reference image.

The variable length encoding unit 16 encodes the quantized DCT coefficients provided from the quantization unit 15 into a variable length encoded bitstream. Thus originated bitstream is provided to the originated data volume measurement unit 12 and the buffer 17. The buffer 17 outputs the bitstream thus provided at a predetermined outputting rate. The outputting bit rate is a constant encoding bit rate in the constant bit rate encoding mode and is a variable encoding bit rate in the variable bit rate encoding mode. Further, the buffer 17 provides the buffer occupancy index to the quantization control unit 10 and the quantization scale—maximum data volume calculation unit 13.

The originated data volume measurement unit 12 measures the volume of the originated bitstream data and advises the originated data volume to the encoding data memory 11 and the quantization control buffer calculation unit 14. The encoding data memory 11 stores the originated data volume provided from the originated data volume measurement unit 12 and the quantization scale provided from the quantization control unit 10, and provide them to the quantization scale—maximum data volume calculation unit 13.

The maximum data volume for each of the picture types is expressed in the following formulae (5) through (7), where Rmax represents the maximum encoding bit rate of the variable bit rate encoding mode, GOPsize represents a size of a GOP (Group Of Pictures), R represents a maximum data volume of the GOP, Ti represents the maximum data volume of an I picture, Tp represents the maximum data volume of a P picture and Tb represents the maximum data volume of a B picture.

$$Ti=R/(1+Np\times Xp/(Xi\times Kp)+Nb\times Xb/(Xi\times Kb)) \quad (5)$$

$$Tp=R/(Np+Nb\times Kp\times Xb/(Kb\times Xp)) \quad (6)$$

$$Tb=R/(Nb+Np\times Kb\times Xp/(Kp\times Xb)) \quad (7)$$

where R=RmaxXGOPsize/29.97 (when input is an NTSC signal), Np=a number of the P pictures in the GOP, Nb=a number of the B pictures in the GOP, Xi=SixQi, an initial value of the Xi=XiO=160×bit_rate/115, Xp=SpxQp, an initial value of the Xp=Xp0=50×bit_rate/115, Xb=SbxQb, an initial value of the Xb=Xb0=42×bit_rate/115, Kp=1.0, Kb=1.4, Si=the originated data volume of an I picture, Sp=the originated data volume of a P picture, Sb=the originated data volume of a B picture and bit_rate=the encoding rate.

When the I picture is encoded, the I picture maximum data volume Ti is calculated by the formula (5). Actual data volume of the encoded I picture may be smaller than Ti. The actual data volume is subtracted from the GOP maximum data volume R. The updated R is used in calculating the maximum data volume for the P picture Tp, while the P picture is encoded. Actual data volume for the encoded P picture is subtracted from the above updated R. The further updated R is used to calculate the B picture maximum data volume Tb. This process is repeated until the GOP encoding is finished.

The quantization scale—maximum data volume calculation unit 13 provides the quantization control unit 10 with the originated data volume stored in the encoding data memory 11 and the quantization scale for each encoding block (macroblock) of the encoding target image as calculated from statistics of encoding information, such as the quantization scale, of an encoded frame. The quantization scale—maximum data volume calculation unit 13 further calculates a single I image frame maximum data volume and provides the volume to the quantization control buffer calculation unit 14. Here, the maximum data volume is not a target value of the originated data volume, but is the maximum originated data volume that does not cause an encoding control buffer collapse and that observes the maximum encoding bit rate.

The quantization control buffer calculation unit 14 performs a calculation according to the above described formula (2) every time an image data for an encoding block (macroblock) is encoded based on the maximum data volume provided from the quantization scale—maximum data volume calculation unit 13 and the originated data volume provided by the originated data volume measurement unit 12 such that the minimum quantization scale that prevents the buffer collapse and that observes the limit of the maximum encoding bit rate is provided to the quantization control unit 10.

The quantization control unit 10 supervises the buffer collapse based on the buffer occupancy index provided from the buffer 17 and controls the quantization scale to prevent an origination of an originated data volume that causes a collapse. The quantization control unit 10 compares the quantization scale provided from the quantization control buffer calculation unit 14 with the quantization scale provided from the quantization scale—maximum data volume calculation unit 13, and provides the greater of the two scales to the quantization unit 15.

The quantization scale—maximum data volume calculation unit 13 predicts the image complexity before encoding the encoding target image. If the actual image complexity is high and the image compression is difficult against the prediction that the complexity is low and the image compression is easy, and further if the encoding is performed by the preset quantization scale for each encoding block (macroblock), then the originated data volume will become greater than predicted to possibly cause a buffer collapse and an violation of the maximum encoding bit rate.

To avoid these, the minimum quantization scale that will originate encoded data volume smaller than the maximum data volume is calculated prior to encoding according the to formula (2) presented above for each encoding block (macroblock), the minimum quantization scale thus calculated is compared with the quantization scale that has been calculated previously, and the greater of the two quantization scales is used in the quantization, thereby preventing the VBV buffer collapse and observing the maximum encoding bit rate.

The quantization scale—maximum data volume calculation unit 13 calculates the quantization scale for each encoding block (macroblock) in this embodiment. The quantization scale may be the same across the encoding blocks within an image frame. Further the quantization control buffer calculation unit 14 calculates the quantization scale for each encoding block (macroblock) in this embodiment, which is compared with the quantization scale determined by the quantization scale—maximum data volume calculation unit 13 prior to encoding. The quantization control buffer calculatson unit 14 may calculate the quantization scale for every slice or for every such chosen number of the macroblocks as five.

When the quantization control buffer calculation unit 14 calculates the quantization scale, it uses the image frame maximum data volume divided by the number of the encoding blocks (macroblocks) in an image frame, i.e., the maximum data volume is evenly distributed, as shown in the formula (2) above. Instead, the calculation can use data volume that is in proportion to the image complexity, e.g., variance of pixels and a sum of absolute differences as obtained from formulae (8) and (9).

$$d_j = d_0 + B_{j-1} - \sum_{i=1}^{j-1} c_i \quad (8)$$

$$C_j = T \times F_j \bigg/ \sum_{i=1}^{MB_{cnt}} F_i \quad (9)$$

Here, $d_j$ represents the quantization control buffer occupancy index of the j-th encoding block (macroblock) prior to encoding, $d_0$ represents the initial occupancy index of the quantization control buffer, $F_j$ represents the image complexity index of the j-th encoding block (macroblock), $C_j$ represents the maximum data volume allocated to the j-th encoding block (macroblock) when the image complexity is the base for dividing a frame into blocks, and T represents the maximum data volume for the image frame.

As described above, the present invention enables to update the quantization scale through the comparison of the first quantization scale based on encoding results of encoded frames with the second quantization scale based on a comparison of the maximum data volume with the originated data volume. Because the second quantization scale observes the maximum data volume, a quantization that is performed by the quanitzation scale that is at least greater than the second quantization scale prevents a collapse of the VBV buffer and a violation of the maximum encoding bit rate, while enabling a variable bit rate encoding in high picture quality. Accordingly, the present invention contributes to enhancements in the image encoding technology.

Further, the present invention is not limited to these embodiments, but various variations and modifications may be made without departing from the scope of the present invention.

The present application is based on Japanese priority application No. 2000-237572 filed on Aug. 4, 2000 with the Japanese Patent Office, the entire contents of which are hereby incorporated by reference.

What is claimed is:

1. An image signal encoding method, in which an image frame is quantized by a quantization scale and thus quantized image frame is encoded, comprising the steps of:
   calculating a maximum data volume and a first quantization scale according to encoding results of encoded image frames and calculating a predicted data volume of a predetermined block in an encoding target image frame from said maximum data volume;
   quantizing said predetermined block in said encoding target image frame by said quantization scale and calculating an originated data volume of said quanitzed image frame as encoded;
   comparing said predicted data volume with said originated data volume and calculating a second quantization scale to be updated by a result of said comparison; and
   comparing said first quantization scale with said second quantization scale and updating said quanitzation scale so that the greater of the two quantization scales is used.

2. The image signal encoding method as claimed in 1, further comprising a step of enlarging said second quantization scale if said originated data volume is greater than predicted data volume and said second quantization scale is set smaller if said originated data volume is less than predicted data volume in said second quantization scale calculation stage.

3. The image signal encoding method as claimed in 1, further comprising a step of performing said comparison of said first quantization scale with said second quantization scale for each encoding block of said encoding target image frame.

4. The image signal encoding method as claimed in 1, wherein said first quantization scale is a constant within said encoding target image frame.

5. The image signal encoding method as claimed in 1, wherein said maximum data volume is the maximum originated data volume that does not cause a VBV buffer collapse and that satisfies the maximum encoding bit rate.

6. The image signal encoding method as claimed in 1, further comprising a step of calculating said predicted data volume based on a ratio of a sum of image complexity indices of an encoded block to a sum of image complexity indices of an encoded block that belongs to said encoding target image frame.

7. The image signal encoding method as claimed in 1, wherein a block that forms said encoding target image frame is a predetermined encoding block.

8. An image signal encoding apparatus, in which an image frame is quantized by a quantization scale and thus quantized image frame is encoded, comprising:
   a first quantization scale—maximum data volume calculation unit calculating a maximum data volume and a first quantization scale according to encoding results of encoded image frames;
   a quantization control buffer calculation unit which calculates a predicted data volume of a block that belongs to said encoding target image frame, while quantizing the block that belongs to said encoding target image frame by said quantization scale, receives an originated data volume of an encoded image frame of thus quantized image frame, and calculates a second quantization scale based on a difference between said predicted data volume and originated data volume; and
   a quantization unit which compares said first quantization scale with said second quantization scale and outputs the greater of the two quantization scales as a new quantization scale.

9. The image signal encoding apparatus as claimed in 8, further comprising:
   an originated data volume measuring unit that measures the volume of data originated by encoding a quantized image frame that is quantized by said quantization scale, block by block of said encoding target image frame; and
   an encoding data memory unit that stores the originated data volume as provided from said originated data volume measuring unit and the quantization scale provided by said quantization control unit.

10. The image signal encoding apparatus as claimed in 8, wherein said quanitzation control buffer calculation unit causes said second quantization scale greater if said originated data volume is greater that predicted data volume and causes said second quantization scale smaller if said originated data volume is smaller than predicted data volume.

11. The image signal encoding apparatus as claimed in 8, wherein the quantization control unit compares said first quantization scale with the second quantization scale for each block of said encoding target image frame in a predetermined encoding block that forms the encoding target image frame.

12. The image signal encoding apparatus as claimed in 8, wherein said first quantization scale is a constant within said encoding target image frame.

13. The image signal encoding apparatus as claimed in 8, wherein said maximum data volume satisfies a maximum encoding bit rate without collapsing a VBV buffer while.

14. The image signal encoding apparatus as claimed in 8, in which said predicted data volume is calculated from a ratio of a sum of image complexity indices of encoded blocks to a sum of image complexity indices of blocks of said encoding target image frame.

15. The image signal encoding apparatus as claimed in 8, in which a block of said encoding target image frame is a predetermined encoding block.

* * * * *